US012725955B2

(12) United States Patent
Nayak et al.

(10) Patent No.: US 12,725,955 B2
(45) Date of Patent: Sep. 1, 2026

(54) TWO-WAY RECEPTACLE FOR UNIVERSAL SERIAL BUS

(71) Applicant: Western Digital Technologies, Inc., San Jose, CA (US)

(72) Inventors: Shailesh R. Nayak, Bangalore (IN); Joe Paul Moolanmoozha, Bangalore (IN); Siddhi M. Karadkhedkar, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 367 days.

(21) Appl. No.: 18/426,878

(22) Filed: Jan. 30, 2024

(65) Prior Publication Data

US 2025/0246837 A1 Jul. 31, 2025

(51) Int. Cl.

| | |
|---|---|
| ***H01R 13/11*** | (2006.01) |
| ***H01R 12/57*** | (2011.01) |
| ***H01R 13/422*** | (2006.01) |
| ***H01R 13/629*** | (2006.01) |
| ***H01R 13/6598*** | (2011.01) |

(52) U.S. Cl.

CPC ............. *H01R 13/11* (2013.01); *H01R 12/57* (2013.01); *H01R 13/4223* (2013.01); *H01R 13/629* (2013.01); *H01R 13/6598* (2013.01)

(58) Field of Classification Search

CPC .... H01R 13/11; H01R 12/57; H01R 13/4223; H01R 13/629; H01R 13/6598; H01R 27/00; H01R 12/716; H01R 2201/06; H01R 24/60; H01R 43/16; H01R 13/5025; H01R 13/6315; H01R 13/631; H01R 29/00; H01R 13/26; H01R 43/18; H01R 13/642; H01R 12/91; H01R 13/405

See application file for complete search history.

(56) References Cited

U.S. PATENT DOCUMENTS

| | | | | |
|---|---|---|---|---|
| 7,094,086 | B2 * | 8/2006 | Teicher ................ | H01R 31/065 439/954 |
| 7,591,657 | B2 * | 9/2009 | Teicher .............. | H01R 13/6469 439/954 |
| 7,717,717 | B1 | 5/2010 | Lai | |
| 8,198,563 | B2 | 6/2012 | Tsai | |
| 9,142,926 | B2 * | 9/2015 | Tsai ................... | H01R 12/7076 |
| 9,209,543 | B2 * | 12/2015 | Yokoyama ........... | H01R 12/732 |
| 9,231,344 | B1 | 1/2016 | Liao | |
| 10,797,442 | B2 | 10/2020 | Tsai | |
| 2017/0012391 | A1 | 1/2017 | Wang et al. | |

* cited by examiner

*Primary Examiner* — Edwin A. Leon

(74) *Attorney, Agent, or Firm* — LOZA & LOZA, LLP; Gabriel Fitch

(57) ABSTRACT

Systems and apparatus for a Universal Serial Bus (USB) socket structure configured for duplex connection are provided. The USB socket structure includes a housing and a movable tongue disposed within the housing and configured to be moved between a default position, a first connected position, and a second connected position. The structure further includes a plurality of first contacts disposed on a first surface of the tongue and a plurality of second contacts disposed on a second surface of the tongue, wherein the second surface is opposite to the first surface. Moreover, the plurality of first contacts and the plurality of second contacts comprise a curved shape in accordance with USB standard specifications for a Type-A USB receptacle.

19 Claims, 13 Drawing Sheets

TWO-WAY RECEPTACLE FOR UNIVERSAL SERIAL BUS

FIELD

The subject matter described herein relates to connectors for Universal Serial Buses (USB). More particularly, the subject matter relates, in some examples, to a USB receptacle having a movable tongue that enables a USB plug to be mated to the USB receptacle in two orientations.

INTRODUCTION

Universal Serial Bus (USB) is an industry standard bus that enables communication and delivery of power between various types of electronics. It specifies a physical interface and communication protocols for data transfer and power delivery to and from hosts, such as personal computers, peripheral devices, e.g., displays, keyboards, and mass storage devices, and intermediate hubs, which multiply the number of a host's ports.

A USB connector or receptable (e.g., USB Type-A or USB-A connector or receptacle) is widely implemented in many devices for mating with a USB plug (e.g., USB Type-A or USB-A plug) of another device to facilitate data transfer and/or power delivery between such devices via USB protocols. Currently, the USB plug is limited with respect to how it can be physically oriented when mating to the USB receptacle. As such, problems may occur because of the limitation. For example, the USB plug must be manually aligned with the USB receptacle in order to mate the two entities in the correct orientation. Often, the manual alignment requires a visual check to ensure that the plug and connector are mated in the correct orientation. In cases where the device (or chassis) housing the USB receptacle is in a location that is not easily accessible or visible (e.g., located on backside of central processing unit (CPU), rack, and/or server), the manual alignment may involve trial and error, which increases the time and effort required to successfully mate the USB plug with the USB receptacle. Moreover, the USB receptacle is usually soldered to a printed circuit board (PCB). If the USB plug is repeatedly inserted into the USB receptacle in the wrong orientation, then the USB receptacle becomes damaged, thus reducing the reliability of the USB receptacle.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a Universal Serial Bus (USB) socket structure configured for duplex connection. The USB socket structure includes a housing and a movable tongue disposed within the housing and configured to be moved between a default position, a first connected position, and a second connected position. The USB socket structure also includes a plurality of first contacts disposed on a first surface of the tongue and a plurality of second contacts disposed on a second surface of the tongue, wherein the second surface is opposite to the first surface. Moreover, the plurality of first contacts and the plurality of second contacts include a curved shape in accordance with USB standard specifications for a Type-A USB receptacle.

One aspect of the disclosure provides a data storage device, including a Universal Serial Bus (USB) socket structure for duplex connection, a non-volatile memory (NVM), and one or more processors coupled to the NVM and at least one contact of a plurality of first contacts or a plurality of second contacts. The USB socket structure includes a housing and a movable tongue disposed within the housing and configured to be moved between a default position, a first connected position, and a second connected position. The USB socket structure further includes the plurality of first contacts disposed on a first surface of the tongue and the plurality of second contacts disposed on a second surface of the tongue, wherein the second surface is opposite to the first surface. Moreover, the plurality of first contacts and the plurality of second contacts include a curved shape in accordance with USB standard specifications for a Type-A USB receptacle. The one or more processors is configured, individually or in combination, to receive data via the USB socket structure, store at least a portion of received data in the NVM, and control data transfer between the data storage device and another device connected to the data storage device via the USB socket structure.

DETAILED DESCRIPTION

Figure 1:
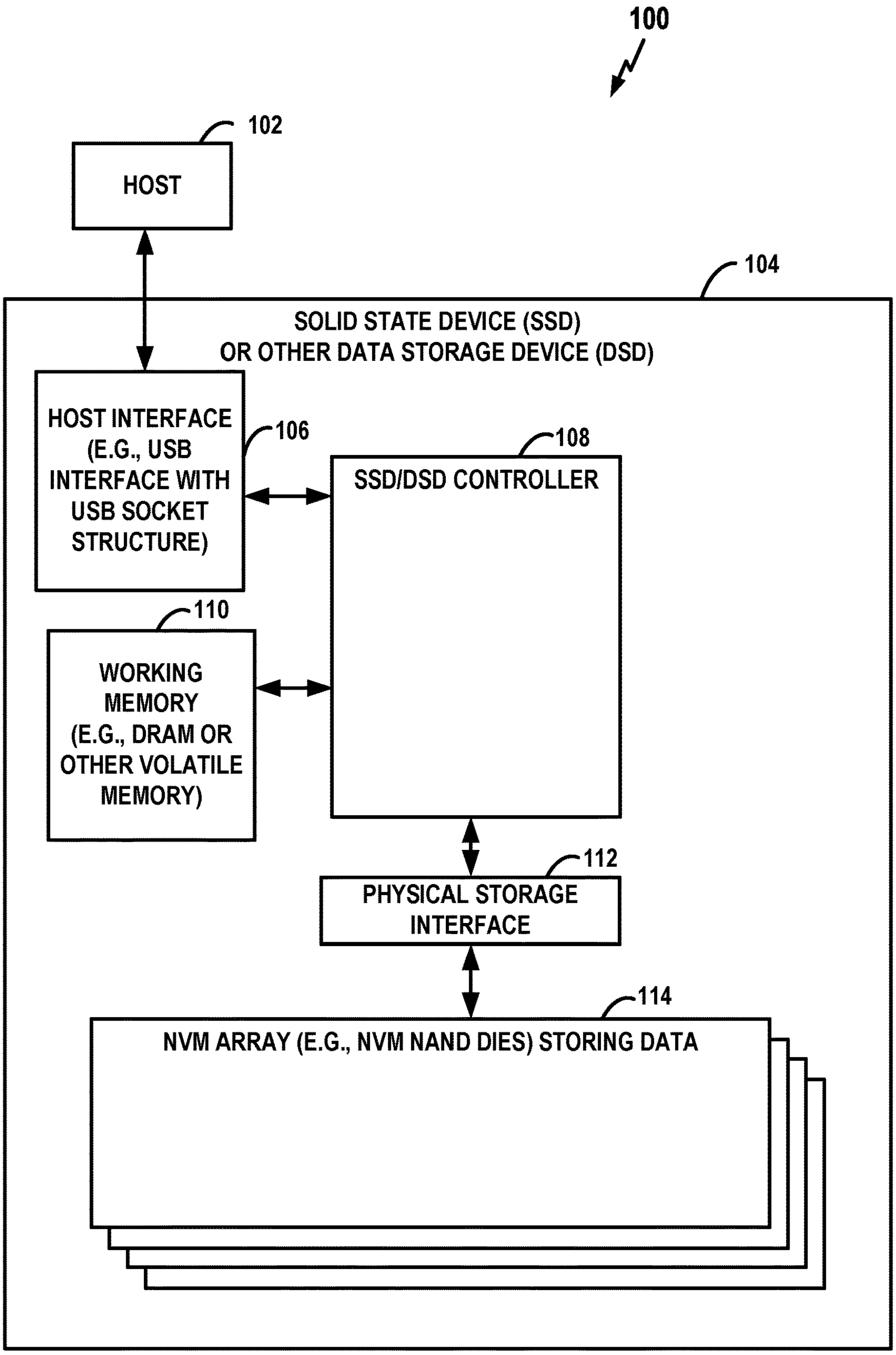
FIG. 1 is a schematic block diagram illustrating an exemplary data storage system including a data storage device (DSD) embodied as a solid-state device (SSD), and an SSD controller configured to control data transfer and/or power delivery between the DSD and other devices via Universal Serial Bus (USB) protocols in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to a USB socket structure (connector or receptacle) having a movable tongue that enables a USB plug to be mated to the USB socket structure in two orientations. In the main examples described herein, data is stored within DSDs with non-volatile memory (NVM) arrays. In other examples, data may be stored in DSDs such as hard disk drives (HDDs) that store the data using magnetic recording techniques. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

A USB plug may be limited with respect to how it can be physically oriented when mating to a USB receptacle. As such, problems arise because of the limitation. For example, because mating the USB plug with the USB receptacle requires manual alignment (with a visual check) to ensure a proper connection in the correct orientation, the time and effort required to successfully mate the USB plug with the USB receptacle increases, especially when a device housing the USB receptacle is not easily accessible or visual. In another example, repeated insertion of the USB plug into the USB receptacle in the wrong orientation may cause the USB receptacle to become damaged, thus reducing the reliability of the USB receptacle. Accordingly, an improved USB receptacle with a movable tongue that facilitates mating with a USB plug regardless of the plug's physical orientation is needed.

The present disclosure is directed to an improved USB socket structure (e.g., USB receptacle connector or USB receptable) that addresses the problems described above. In an aspect, the USB socket structure is configured for duplex connection and includes a housing and a movable tongue disposed within the housing. The movable tongue is configured to be moved between a default position, a first connected position, and a second connected position. The USB socket structure also includes a plurality of first contacts disposed on a first surface of the tongue and a plurality of second contacts disposed on a second surface of the tongue. The second surface is opposite to the first surface. Also, the plurality of first contacts and the plurality of second contacts comprise a curved shape in accordance with USB standard specifications for a Type-A USB receptacle.

Several advantages are provided by the improved USB socket structure. For example, the improved USB socket structure has a movable tongue that enables a USB plug to be mated to a USB receptacle in each of two possible orientations. Thus, the improved USB socket structure reduces (or eliminates) the trial and error involved with manually aligning the USB plug to the USB receptacle prior to mating, and therefore, the time and effort required to successfully mate the USB plug with the USB receptacle is decreased. In another example, the improved USB socket structure prevents the USB plug from being inserted into the USB receptacle in the wrong orientation. Thus, the reliability of the USB receptacle is increased by reducing (or eliminating) any damage-causing repeated insertions of the USB plug into the USB receptacle in the wrong orientation. In a further example, the improved USB receptacle is designed to function with footprints for existing USB receptacles on printed circuit boards (PCBs) of various devices, and therefore, may be a drop-in replacement for current USB receptacle.

Exemplary Devices, Systems and Procedures

FIG. 1 is a schematic block diagram illustrating an exemplary data storage system including a data storage device (DSD) embodied as a solid-state device (SSD), and an SSD controller configured to control data transfer and/or power delivery between the DSD and other devices via Universal Serial Bus (USB) protocols in accordance with some aspects of the disclosure. The system 100 includes a host 102 and the SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. In an aspect, the host 102 may include a USB connector or receptable (e.g. USB Type-A or USB-A connector) for mating with a USB plug (e.g., USB Type-A or USB-A plug) implemented on the SSD 104 (e.g., at the host interface 106) to facilitate the data transfer (and/or power delivery) between the host 102 and the SSD 104 via USB protocols. In another aspect, the host 102 may include a USB plug for mating with the USB connector or receptable implemented on the SSD 104 (e.g., at the host interface 106) to facilitate the data transfer (and/or power delivery) between the host 102 and the SSD 104 via USB protocols. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as dynamic random access memory (DRAM) or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108 (e.g., using a USB socket structure). The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI) (SAS), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies. Links between the host and the SSD may also be provided via one or more memory or system buses, including via interconnects such as Compute Express Link (CXL), Gen-Z, OpenCAPI, NVLink/NVSwitch, Infinity Fabric, Omni-Path and other similar interconnect protocols.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via physical storage (PS) interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110. In some embodiments, the controller 108 and/or the host interface 106 may be situated external to the SSD 104 and configured to manage data transfer to and from the NVM array 114 and/or the working memory 110 located within the SSD 104.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components.

USB Plug and Connector

Figure 2:
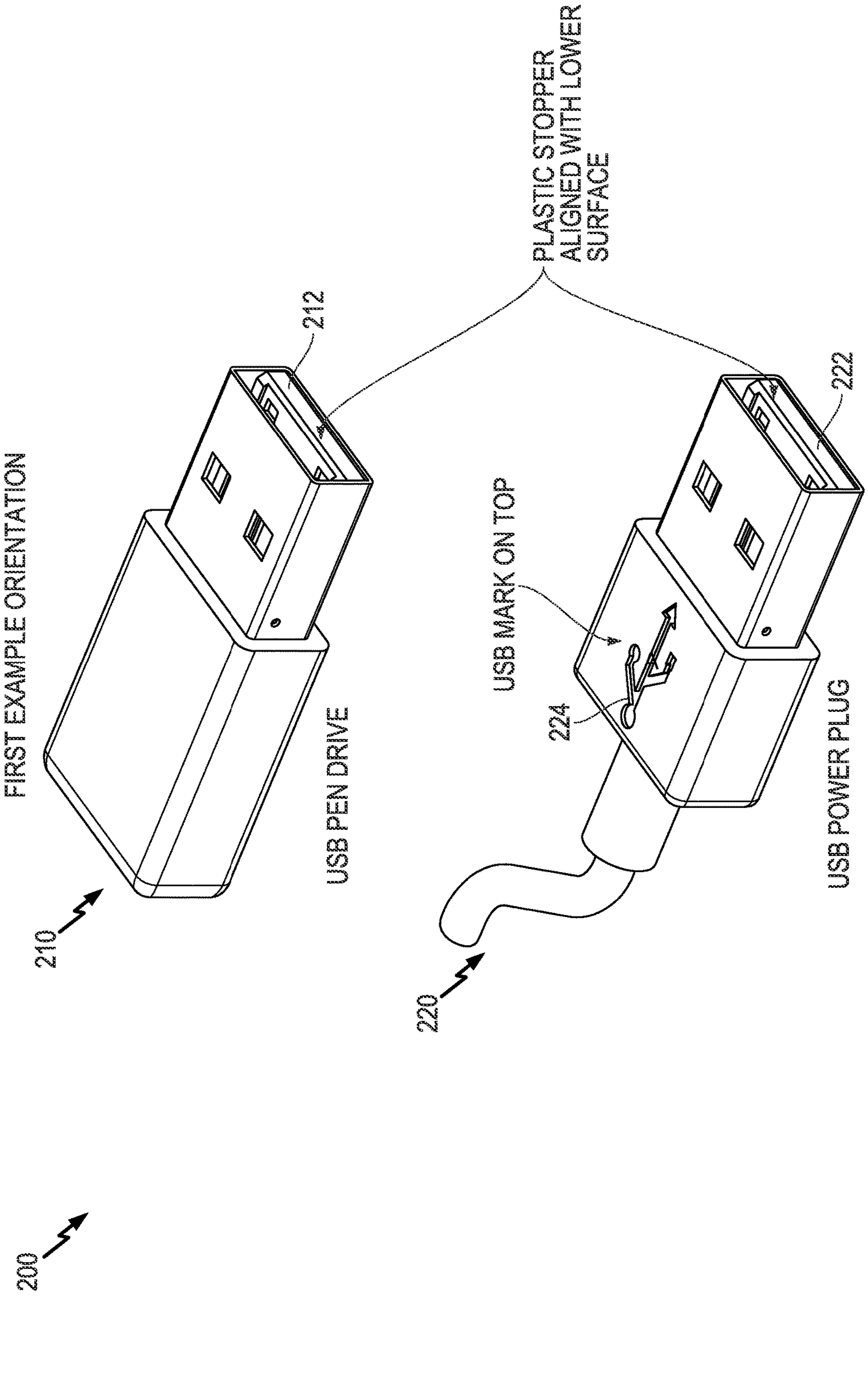
FIG. 2 is a diagram illustrating a first example orientation of USB plugs in accordance with some aspects of the disclosure.
Figure 3:
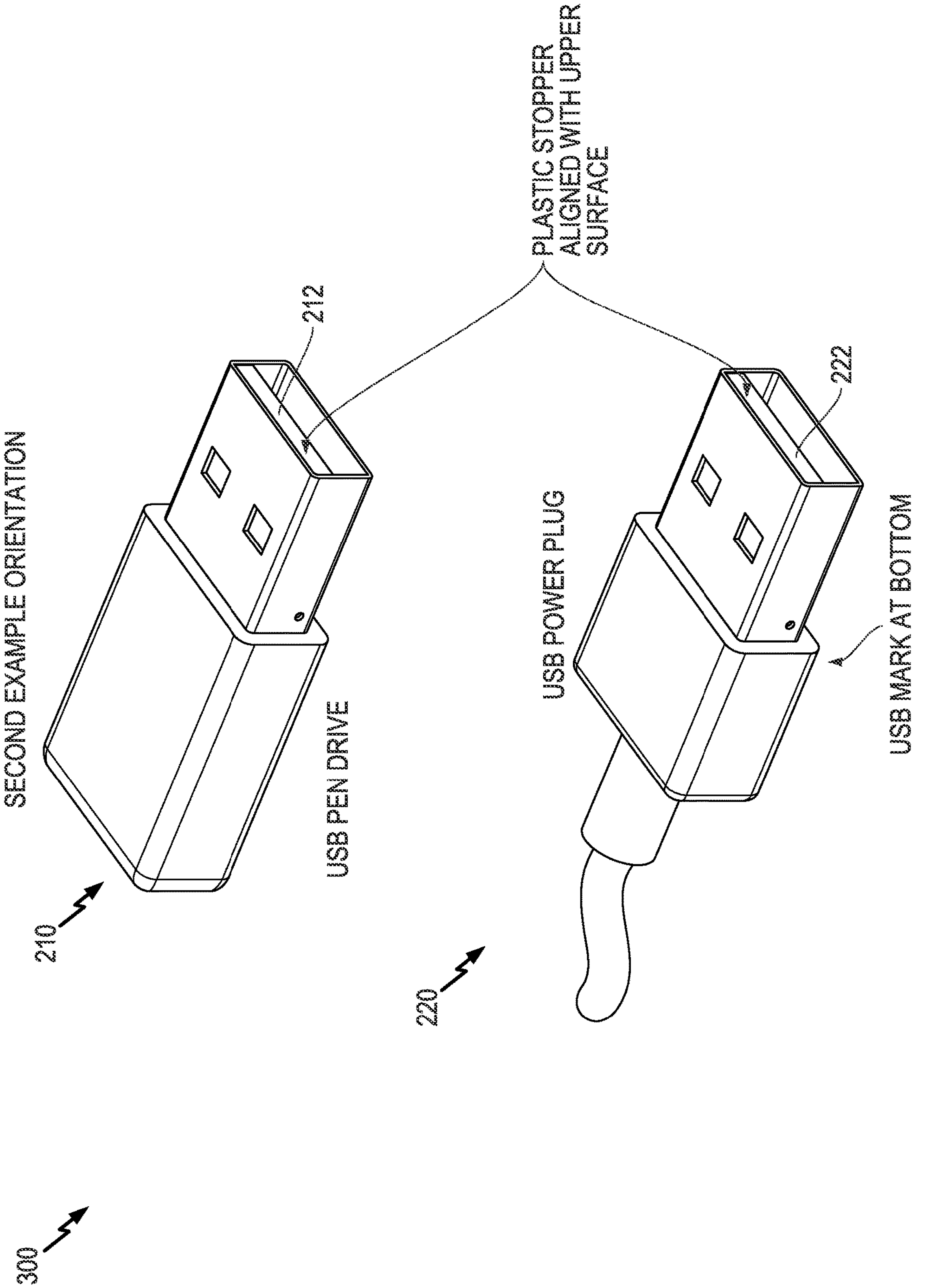
FIG. 3 is a diagram illustrating a second example orientation of the USB plugs in accordance with some aspects of the disclosure.

FIG. 2 is a diagram 200 illustrating a first example orientation of USB plugs in accordance with some aspects of the disclosure. FIG. 3 is a diagram 300 illustrating a second example orientation of the USB plugs in accordance with some aspects of the disclosure. In an aspect, a USB plug (e.g., USB plug connector) may be physically positioned in one of two orientations. Referring to FIG. 2, a first USB plug 210 (e.g., USB pen drive) and a second USB plug 220 (e.g., USB power plug) are shown to be physically positioned in a first example orientation. Notably, responsive to the first USB plug 210 being positioned in the first example orientation, a first stopper 212 (e.g., plastic stopper) of the first USB plug 210 is aligned with (or located closer to) a lower surface of the USB plug. Similarly, responsive to the second USB plug 220 being positioned in the first example orientation, a second stopper 222 (e.g., plastic stopper) of the second USB plug 220 is aligned with (or located closer to) a lower surface of the USB plug. Moreover, if the plug (e.g., USB plug 220) includes a USB mark (or designator) 224 indicating that the plug is a USB-type plug, then the USB mark 224 will be located on an upper surface (or top surface) of the plug responsive to the plug being positioned in the first example orientation.

Referring to FIG. 3, the first USB plug 210 (e.g., USB pen drive) and the second USB plug 220 (e.g., USB power plug) are shown to be physically positioned in a second example orientation. Notably, responsive to the first USB plug 210 being positioned in the second example orientation, the first stopper 212 of the first USB plug 210 is aligned with (or located closer to) an upper surface of the USB plug. Similarly, responsive to the second USB plug 220 being positioned in the second example orientation, the second stopper 222 of the second USB plug 220 is aligned with (or located closer to) an upper surface of the USB plug. Furthermore, the USB mark 224 previously seen on the second USB plug 220 (shown in FIG. 2) is no longer visible in FIG. 3 since the USB mark 224 is now located on a lower surface (or bottom surface) of the plug responsive to the plug being positioned in the second example orientation.

In an aspect, a USB connector (e.g., USB receptacle or USB receptacle connector) may be implemented in a device to mate with a USB plug of another device to facilitate data transfer and/or power delivery between such devices via USB protocols. However, the USB receptacle may be implemented (e.g., structured) in the device such that the USB receptacle can only accept insertion of the USB plug responsive to the USB plug being positioned in a specific orientation. For example, if the USB receptacle is implemented to accept insertion of the USB plug responsive to the USB plug being positioned in the first example orientation (see FIG. 2), then the USB receptacle will physically reject insertion of the USB plug responsive to the USB plug being positioned in the second example orientation (see FIG. 3) because the location of the stopper in the second example orientation (e.g., aligned with upper surface) will physically block the USB plug from mating with the USB receptacle. In another example, if the USB receptacle is implemented to accept insertion of the USB plug responsive to the USB plug being positioned in the second example orientation (see FIG. 3), then the USB receptacle will physically reject insertion of the USB plug responsive to the USB plug being positioned in the first example orientation (see FIG. 2) because the location of the stopper in the first example orientation (e.g., aligned with lower surface) will physically block the USB plug from mating with the USB receptacle.

As described above, the USB plug may be limited with respect to how it can be physically oriented when mating to the USB receptacle. As such, problems may occur because of the limitation. For example, mating the USB plug with the USB receptacle may require manual alignment to mate the two entities in the correct orientation. Often, the manual alignment requires a visual check to ensure that the plug and connector are correctly mated. However, in cases where the device (or chassis) housing the USB receptacle is in a location that is not easily accessible or visible (e.g., located on backside of central processing unit (CPU), rack, and/or server), the manual alignment may involve trial and error, which increases the time and effort required to successfully mate the USB plug with the USB receptacle. Moreover, the USB receptacle may be soldered to a printed circuit board (PCB). If the USB plug is repeatedly inserted into the USB receptacle in the wrong orientation, then the USB receptacle may become damaged (e.g., due to the USB plug stopper wrongly hitting one or more internal components of the USB receptacle), thus reducing the reliability of the USB receptacle. To address the problems described above, an aspect of the disclosure is directed to a novel USB receptacle (or receptable) with a movable tongue that facilitates mating with a USB plug regardless of the plug's physical orientation (e.g., first example orientation or second example orientation). In a further aspect, the novel USB receptacle is designed to function with existing USB footprints on printed circuit boards (PCBs) of various devices, and therefore, may be a drop-in replacement for current USB receptacles.

Figure 4:
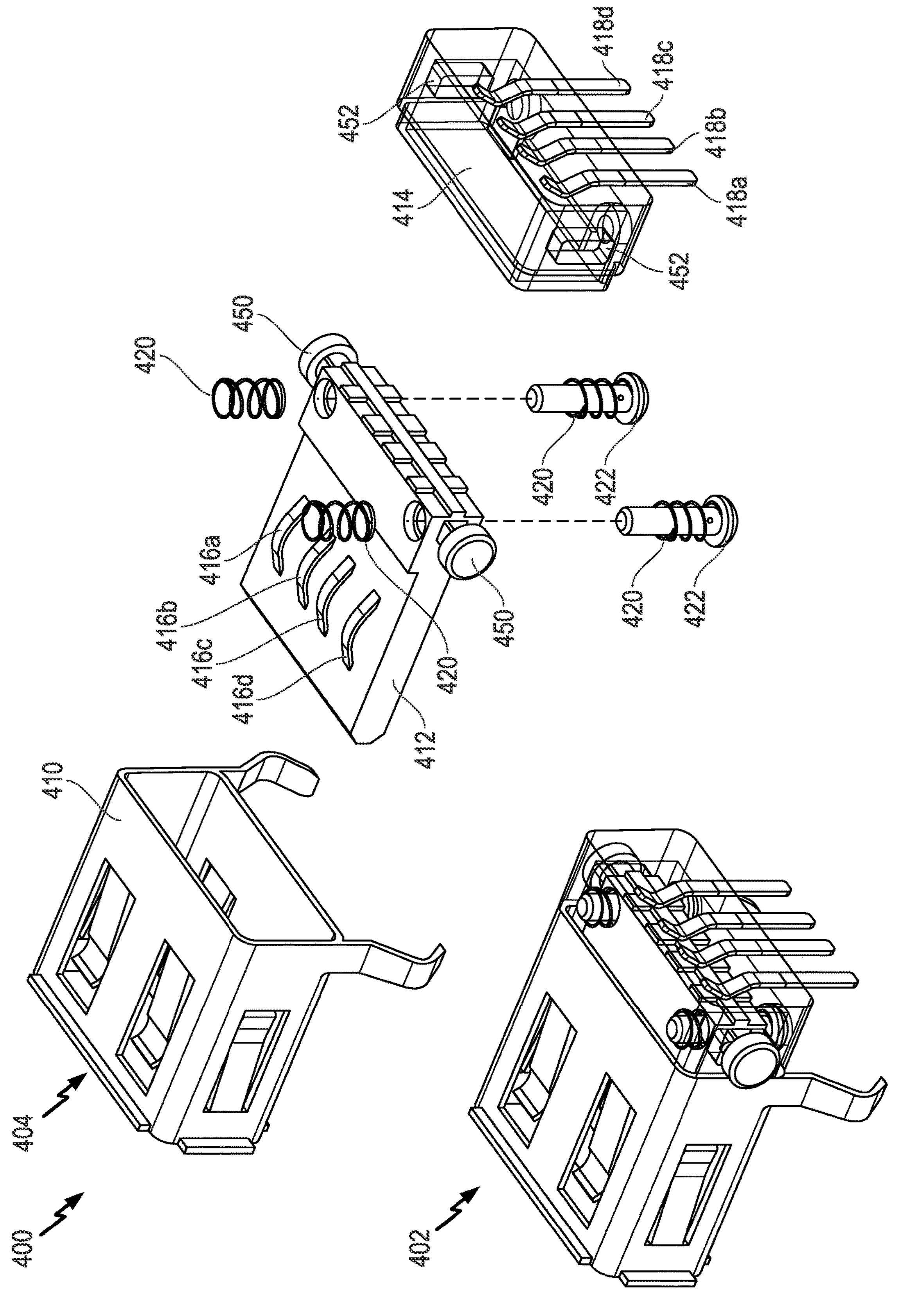
FIG. 4 illustrates an assembled view of an example USB receptacle and an exploded view of the example USB receptacle in accordance with some aspects of the disclosure.

FIG. 4 illustrates an assembled view 402 of an example USB receptacle (e.g., USB socket structure in a receptacle form factor) 400 and an exploded view 404 of the example USB receptacle in accordance with some aspects of the disclosure. The USB receptacle includes a USB shield 410 (e.g., metal shield to prevent electro-magnetic interference (EMI)) and a movable tongue 412. A majority of the USB movable tongue 412 may be housed within the USB shield 410. The USB receptacle further includes a rear cover 414 that mates to the USB shield 410 and houses an end portion of the movable tongue 412 not housed by the USB shield 410.

In an aspect, the end portion of the movable tongue 412 is secured to the rear cover 414 via guide pins 422 that extend through holes in a bottom surface of the rear cover 414 and through holes in the end portion of the movable tongue 412. The holes accommodate springs 420 appended to upper and lower surfaces of the tongue 412. Moreover, the springs 420 are sized to enable the guide pins 422 to pass through an inner diameter of the springs 420. Accordingly, responsive to the end portion of the movable tongue 412 being secured to the rear cover 414 via the guide pins 422 and the rear cover 414 being mated to the USB shield 410, the springs 420 on the upper and lower surfaces of the tongue 412 enable the tongue 412 to be centered (e.g., float) or roughly centered within an inner space of the USB shield 410. Moreover, the springs 420 facilitate the tongue 412 to slide in a vertical direction upward or downward depending on an orientation of a USB plug (e.g., first example orientation or second example orientation) being inserted into the USB receptacle via an opening in the USB shield 410. In an aspect, the end portion of the movable tongue 412 includes retaining knobs 450 extending from side surfaces of the movable tongue 412. Also, the rear cover 414 includes slots 452 formed at side surfaces of the rear cover 414. The retaining knobs 450 of the movable tongue 412 are configured to extend through the slots 452 of the rear cover 414, respectively, to maintain an alignment of the movable tongue 412 in a housing (e.g., shield 410 mated to rear cover 414). Moreover, a size of the slots 452 may define a range of vertical movement of the movable tongue 412 within the housing.

In an aspect, the movable tongue 412 may be made of a plastic material and includes electrical contacts 416*a*, 416*b*, 416*c*, and 416*d* molded into an upper surface of the tongue 412. Although not shown in FIG. 4, the tongue 412 also includes electrical contacts 426*a*, 426*b*, 4216*c*, and 426*d* molded into a lower surface of the tongue 412. The rear cover 414 may also be made of a plastic material and includes electrical contacts 418*a*, 418*b*, 418*c*, and 418*d* molded into the cover 414. As such, either the electrical contacts 416*a*, 416*b*, 416*c*, and 416*d* molded into the upper surface of the tongue 412 or the electrical contacts 426*a*, 426*b*, 4216*c*, and 426*d* molded into the lower surface of the tongue 412 will electrically connect with (contact) the electrical contacts 418*a*, 418*b*, 418*c*, and 418*d* of the cover 414 depending on the orientation of the USB plug being inserted into the USB receptacle via the opening in the USB shield 410. In a default position, where no USB plug is inserted into the USB receptacle 400, the electrical contacts 418*a*, 418*b*, 418*c*, and 418*d* may not be connected to either of the electrical contacts 416*a*, 416*b*, 416*c*, and 416*d* molded into the upper surface of the tongue 412 or the electrical contacts 426*a*, 426*b*, 4216*c*, and 426*d* molded into the lower surface of the tongue 412, and thus will be effectively floating.

Figure 5A:
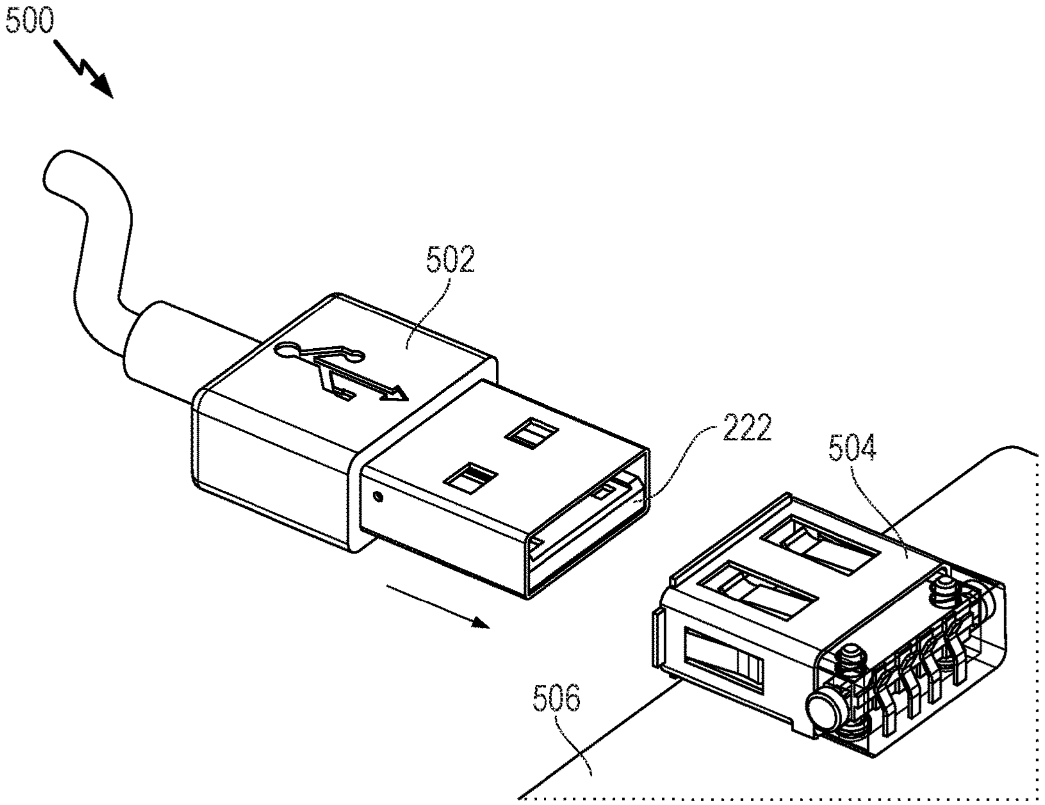
FIG. 5A is a perspective view of a USB plug being inserted into a USB receptacle mounted to a device in accordance with some aspects of the disclosure.
Figure 5B:
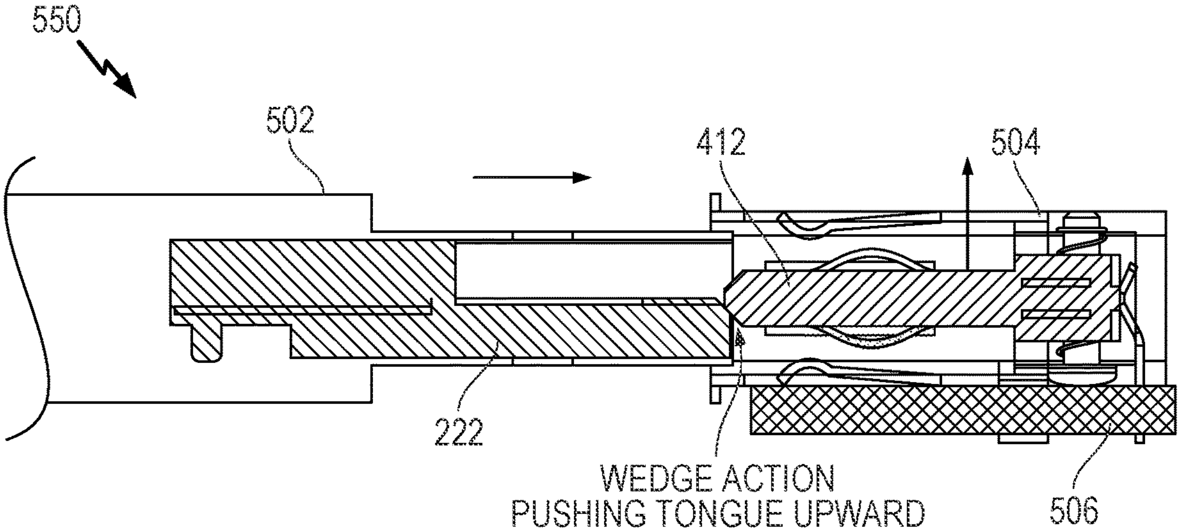
FIG. 5B is a cross-sectional view of the USB plug being inserted into the USB receptacle mounted to the device in accordance with some aspects of the disclosure.

FIG. 5A is a perspective view 500 of a USB plug 502 being inserted into a USB receptacle 504 mounted to a device 506 in accordance with some aspects of the disclosure. FIG. 5B is a cross-sectional view 550 of the USB plug 502 being inserted into the USB receptacle 504 mounted to the device 506 in accordance with some aspects of the disclosure. In an aspect, if the USB 502 plug is inserted into the USB receptacle 504 according to the first example orientation (e.g., stopper 222 aligned with lower surface of USB plug 502, then the tongue 412 will move in an upward vertical direction as the stopper 222 of the USB plug 502 is moved into the USB receptacle 504 to wedge against the tongue 412 causing the tongue 412 to be pushed upward.

Figure 6A:
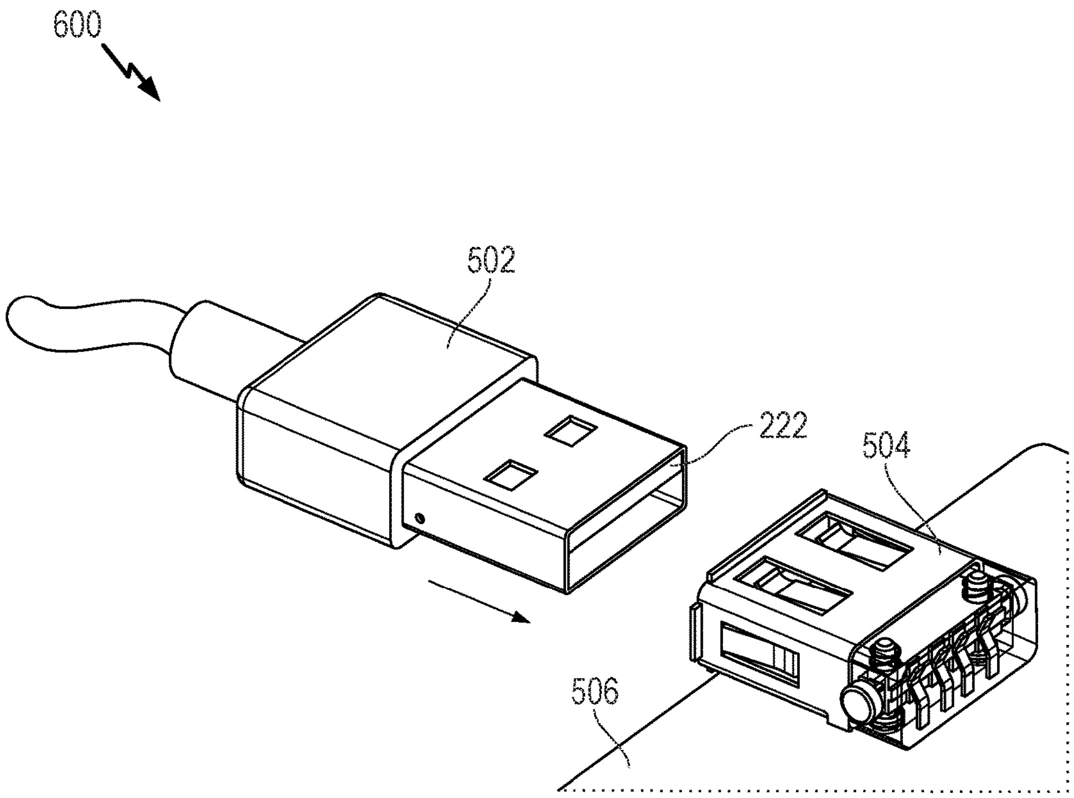
FIG. 6A is a perspective view of the USB plug being inserted into the USB receptacle mounted to the device in accordance with some aspects of the disclosure.
Figure 6B:
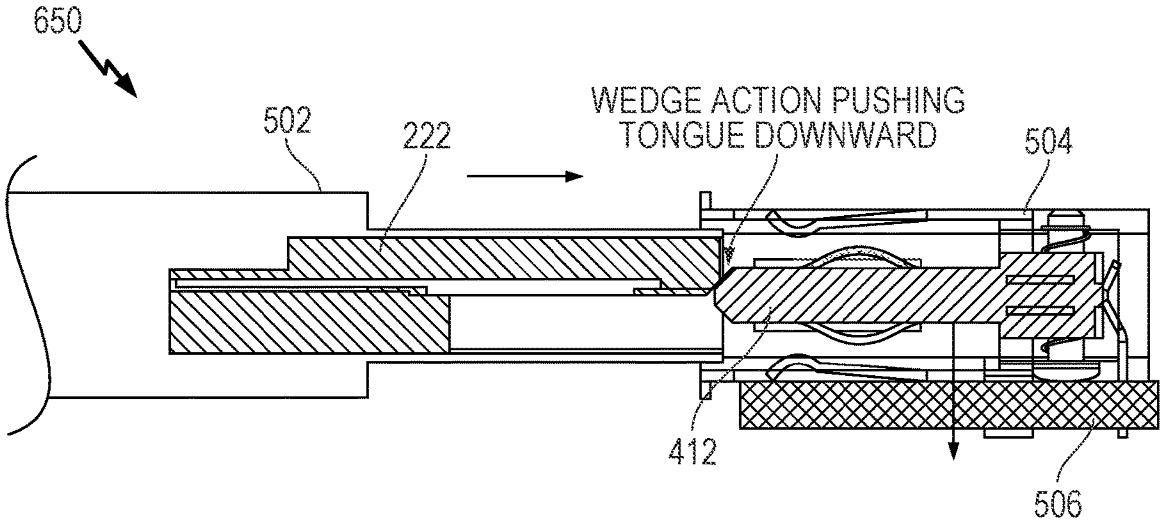
FIG. 6B is a cross-sectional view of the USB plug being inserted into the USB receptacle mounted to the device in accordance with some aspects of the disclosure.

FIG. 6A is a perspective view 600 of the USB plug 502 being inserted into the USB receptacle 504 mounted to the device 506 in accordance with some aspects of the disclosure. FIG. 6B is a cross-sectional view 650 of the USB plug 502 being inserted into the USB receptacle 504 mounted to the device 506 in accordance with some aspects of the disclosure. In an aspect, if the USB 502 plug is inserted into the USB receptacle 504 according to the second example orientation (e.g., stopper 222 aligned with upper surface of USB plug 502, then the tongue 412 will move in a downward vertical direction as the stopper 222 of the USB plug 502 is moved into the USB receptacle 504 to wedge against the tongue 412 causing the tongue 412 to be pushed downward.

Figure 7A:
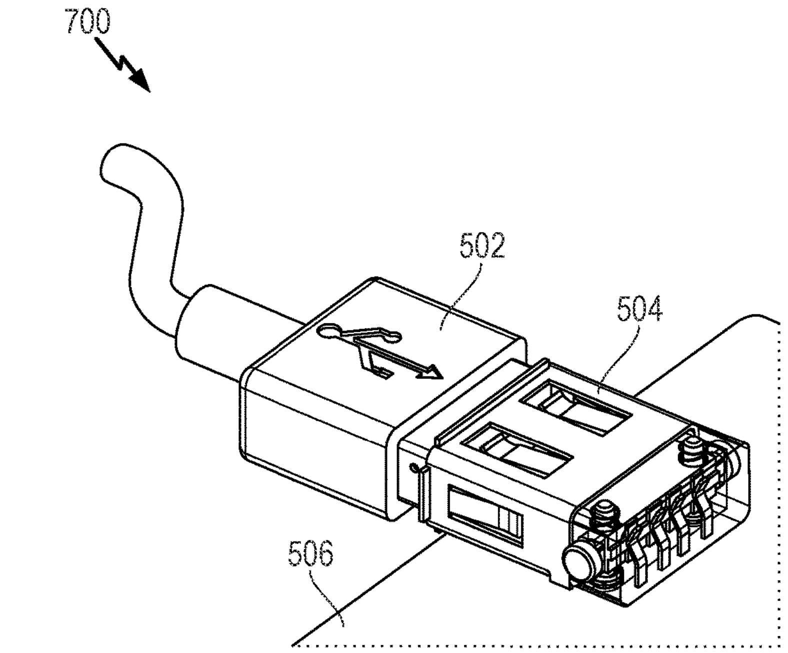
FIG. 7A is a perspective view of the USB plug mated to the USB receptacle mounted to the device in accordance with some aspects of the disclosure.
Figure 7B:
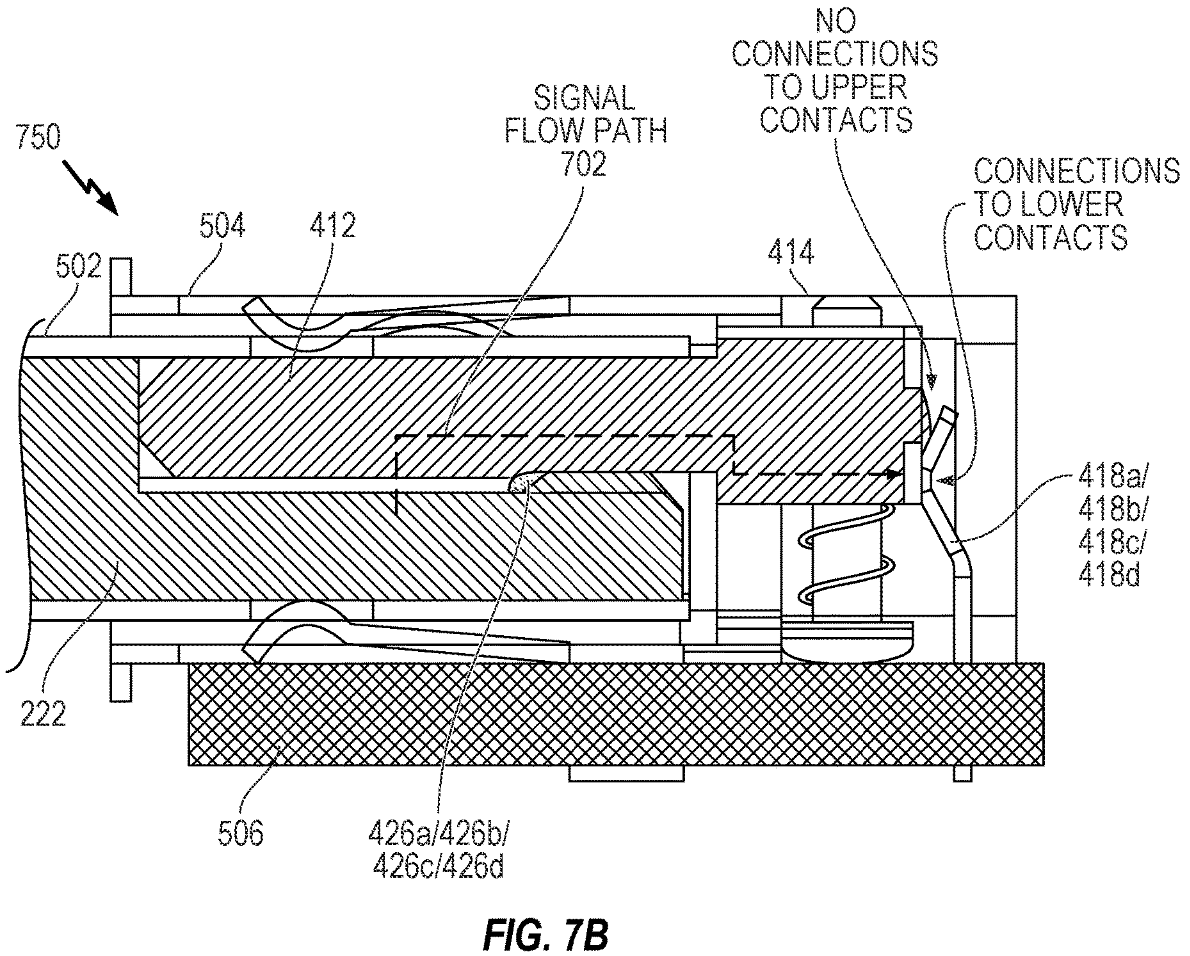
FIG. 7B is a cross-sectional view of the USB plug mated to the USB receptacle mounted to the device in accordance with some aspects of the disclosure.

FIG. 7A is a perspective view 700 of the USB plug 502 mated to the USB receptacle 504 mounted to the device 506 in accordance with some aspects of the disclosure. FIG. 7B is a cross-sectional view 750 of the USB plug 502 mated to the USB receptacle 504 mounted to the device 506 in accordance with some aspects of the disclosure. In an aspect, responsive to the USB plug 502 being mated to the USB receptacle 504 in the first example orientation (e.g., stopper 222 aligned with lower surface of USB plug 502), then the tongue 412 is lifted in the upward vertical direction by the stopper 222 of the USB plug 502. Accordingly, the electrical contacts 426*a*, 426*b*, 426*c*, and 426*d* molded into the lower surface of the tongue 412 electrically connect to the USB plug 502 (e.g., via electrical contacts at the stopper 222) at one end and electrically connect to the electrical contacts 418*a*, 418*b*, 418*c*, and 418*d* of the cover 414 at another end to provide a signal flow path 702 between the USB plug 502 and the USB receptacle 504. Notably, to avoid shorting, the electrical contacts 416*a*, 416*b*, 416*c*, and 416*d* molded into the upper surface of the tongue 412 have no electrical connection to the USB plug 502 (via the stopper 222) nor the electrical contacts 418*a*, 418*b*, 418*c*, and 418*d* of the cover 414 responsive to the tongue 412 being lifted in the upward vertical direction by the stopper 222 of the USB plug 502.

Figure 8A:
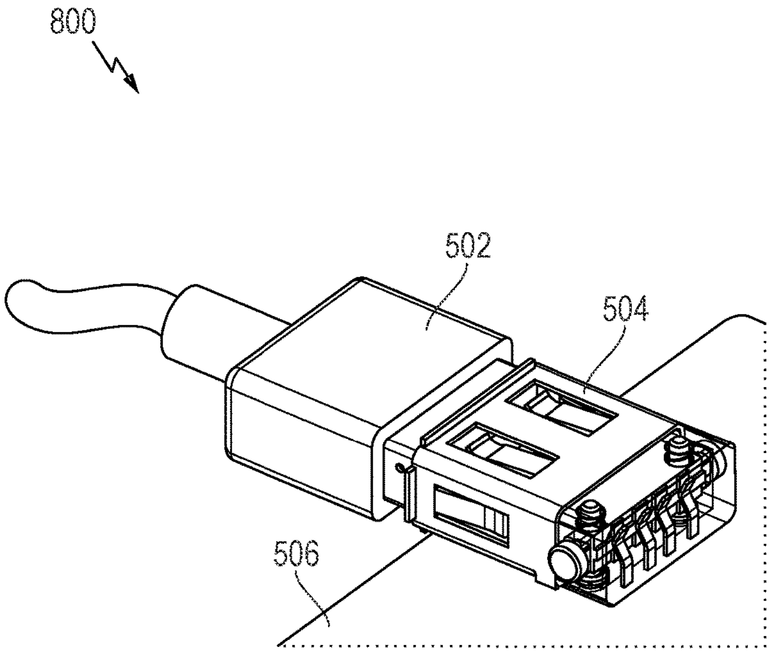
FIG. 8A is a perspective view of the USB plug mated to the USB receptacle mounted to the device in accordance with some aspects of the disclosure.
Figure 8B:
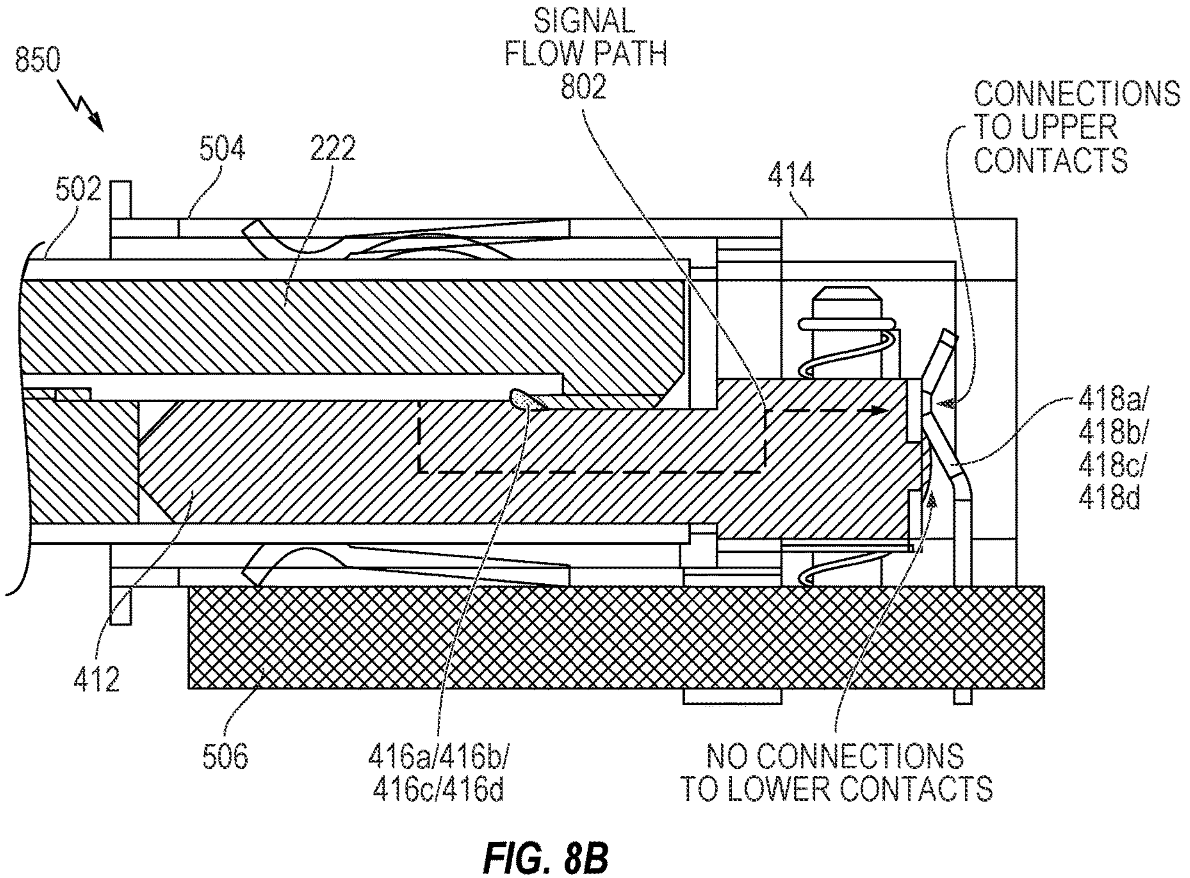
FIG. 8B is a cross-sectional view of the USB plug mated to the USB receptacle mounted to the device in accordance with some aspects of the disclosure.

FIG. 8A is a perspective view 800 of the USB plug 502 mated to the USB receptacle 504 mounted to the device 506 in accordance with some aspects of the disclosure. FIG. 8B is a cross-sectional view 850 of the USB plug 502 mated to the USB receptacle 504 mounted to the device 506 in accordance with some aspects of the disclosure. In an aspect, responsive to the USB plug 502 being mated to the USB receptacle 504 in the second example orientation (e.g., stopper 222 aligned with upper surface of USB plug 502), then the tongue 412 is lowered in the downward vertical direction by the stopper 222 of the USB plug 502. Accordingly, the electrical contacts 416*a*, 416*b*, 416*c*, and 416*d* molded into the upper surface of the tongue 412 electrically connect to the USB plug 502 (e.g., via electrical contacts at the stopper 222) at one end and electrically connect to the electrical contacts 418*a*, 418*b*, 418*c*, and 418*d* of the cover 414 at another end to provide a signal flow path 802 between the USB plug 502 and the USB receptacle 504. Notably, to avoid shorting, the electrical contacts 426*a*, 426*b*, 426*c*, and 426*d* molded into the lower surface of the tongue 412 have no electrical connection to the USB plug 502 (via the stopper 222) nor the electrical contacts 418*a*, 418*b*, 418*c*, and 418*d* of the cover 414 responsive to the tongue 412 being lowered in the downward vertical direction by the stopper 222 of the USB plug 502.

Figure 9:
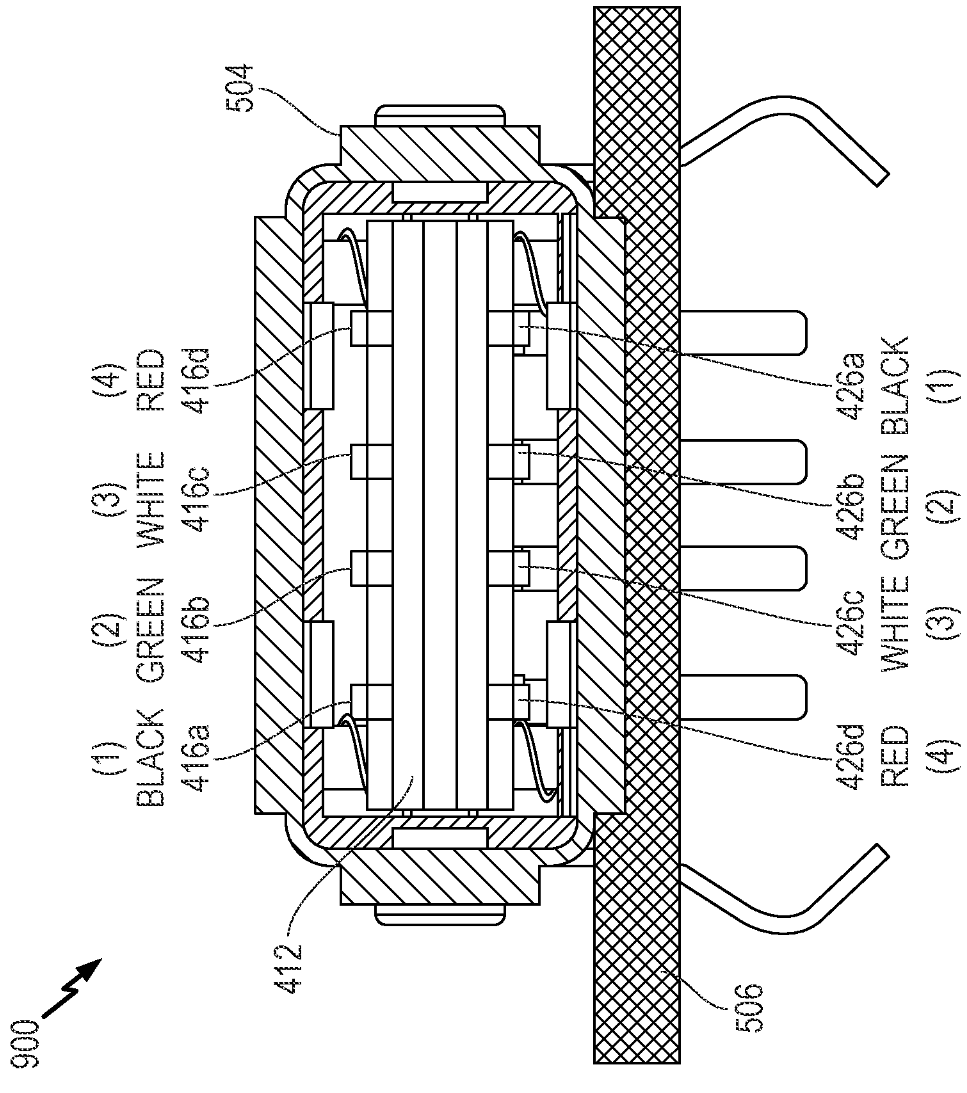
FIG. 9 is a diagram illustrating a correspondence between the electrical contacts molded into the upper surface of the tongue and the electrical contacts molded into the lower surface of the tongue for a USB receptacle in accordance with some aspects of the disclosure.

FIG. 9 is a diagram 900 illustrating a correspondence between the electrical contacts 416*a*, 416*b*, 416*c*, and 416*d* molded into the upper surface of the tongue 412 and the electrical contacts 426*a*, 426*b*, 426*c*, and 426*d* molded into the lower surface of the tongue 412 in accordance with some aspects of the disclosure. As an example, each electrical contact molded into the upper surface of the tongue 412 of the USB receptacle 504 may be assigned a reference number and/or color to identify its position (pin position) relative to the other contacts molded into the upper surface. As shown, a first upper electrical contact 416*a* may be identified by the number 1 and/or the color black, a second upper electrical contact 416*b* may be identified by the number 2 and/or the color green, a third upper electrical contact 426*b* may be identified by the number 3 and/or the color white, and a fourth upper electrical contact 426*c* may be identified by the number 4 and/or the color red.

In an aspect, an upper electrical contact of the tongue 412 has a crisscross connection with a corresponding lower electrical contact of the tongue 412. For example, the first upper electrical contact 416*a* located at a farthest-left side of the tongue 412 facilitates the same electrical connection (signal flow) to the device 506 as a first lower electrical contact 426*a* molded into the lower surface of the tongue 412 and located at a farthest-right side of the tongue 412. Similarly, the second upper electrical contact 416*b* located at a second farthest-left side of the tongue 412 provides the same electrical connection to the device 506 as a second lower electrical contact 426*b* located at a second farthest-right side of the tongue 412. Moreover, the third upper electrical contact 416*c* located at a third farthest-left side of the tongue 412 provides the same electrical connection to the device 506 as a third lower electrical contact 426*c* located at a third farthest-right side of the tongue 412. And the fourth upper electrical contact 416*d* located at a farthest-right side of the tongue 412 provides the same electrical connection to the device 506 as a fourth lower electrical contact 426*d* located at a farthest-left side of the tongue 412. Accordingly, the first lower electrical contact 426*a* may also be identified by the number 1 and/or the color black, the second lower electrical contact 426*b* may also be identified by the number 2 and/or the color green, the third lower electrical contact 426*c* may also be identified by the number 3 and/or the color white, and the fourth lower electrical contact 426*d* may also be identified by the number 4 and/or the color red. Notably, because of the crisscross connection between the upper contacts and the lower contacts of the tongue 412 described above, the individual contacts connecting to the USB plug 502 provide the same electrical connection (signal flow) to the device 506 regardless of whether the USB plug 502 is mated to the USB receptacle 504 in the first example orientation (e.g., stopper 222 aligned with lower surface of USB plug 502) or the second example orientation (e.g., stopper 222 aligned with upper surface of USB plug 502).

Figure 10:
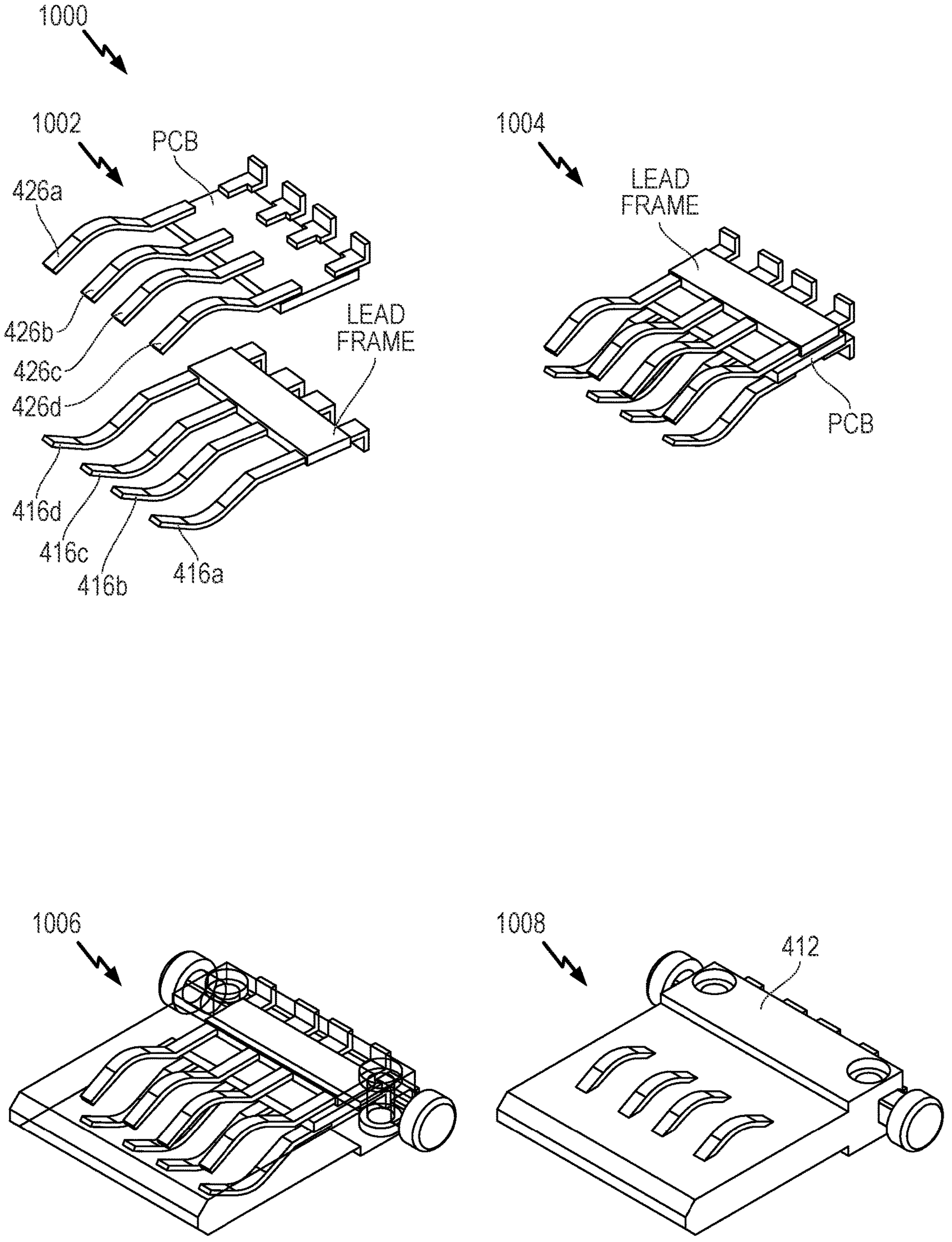
FIG. 10 is a diagram illustrating an example sequence for molding the electrical contacts into the tongue of the USB receptacle in accordance with some aspects of the disclosure.

FIG. 10 is a diagram 1000 illustrating an example sequence for molding the electrical contacts into the tongue 412 of the USB receptacle 504 in accordance with some aspects of the disclosure. At 1002, lower electrical contacts 426*a*, 426*b*, 426*c*, and 426*d* may be soldered onto a printed circuit board (PCB). Also, a lead frame for the upper electrical contacts 416*a*, 416*b*, 416*c*, and 416*d* may be pre-molded. In an aspect, the PCB facilitates the crisscrossed connections between the lower electrical contacts 426*a*, 426*b*, 426*c*, and 426*d* and the upper electrical contacts 416*a*, 416*b*, 416*c*, and 416*d*. At 1004, the lower electrical contacts 426*a*, 426*b*, 426*c*, and 426*d* and the upper electrical contacts 416*a*, 416*b*, 416*c*, and 416*d* are arranged together prior to being molded with material (e.g., plastic insulating material) forming the tongue 412. At 1006, the material is further molded over the PCB, lead frame, lower electrical contacts, and upper electrical contacts to form the tongue 412 at 1008.

Figure 11:
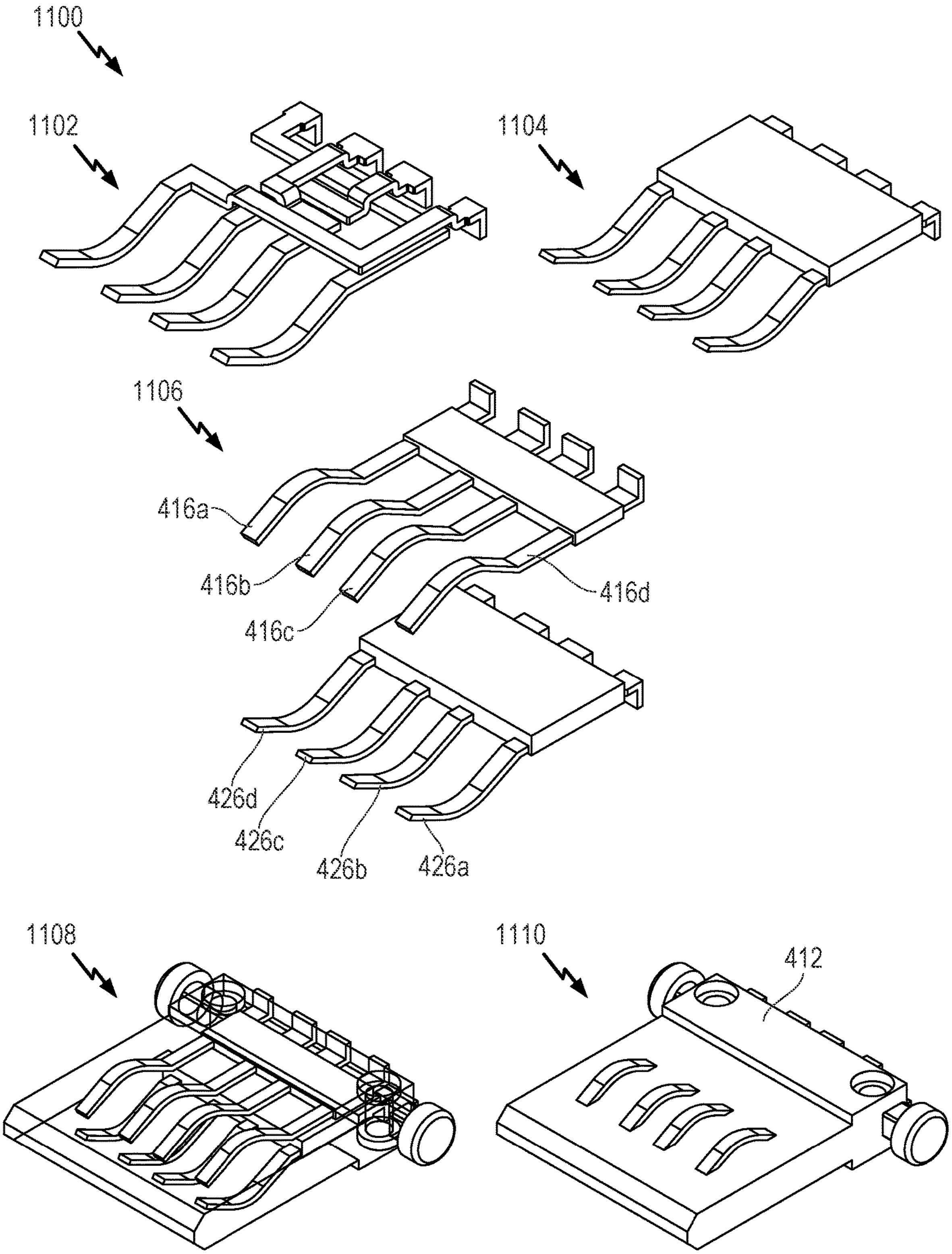
FIG. 11 is a diagram illustrating another example sequence for molding the electrical contacts into the tongue of the USB receptacle in accordance with some aspects of the disclosure.

FIG. 11 is a diagram 1100 illustrating another example sequence for molding the electrical contacts into the tongue 412 of the USB receptacle 504 in accordance with some aspects of the disclosure. At 1102, a lead frame for the upper electrical contacts 416*a*, 416*b*, 416*c*, and 416*d* and/or the lower electrical contacts 426*a*, 426*b*, 426*c*, and 426*d* is provided. Notably, insulation, generally in the form of plastic, is present between the contacts in the completed assembly. At 1104, the lead frame for the electrical contacts is pre-molded. In an aspect, the lead frame facilitates the crisscrossed connections between the lower electrical contacts 426*a*, 426*b*, 426*c*, and 426*d* and the upper electrical contacts 416*a*, 416*b*, 416*c*, and 416*d*. At 1106, the lower electrical contacts 426*a*, 426*b*, 426*c*, and 426*d* and the upper electrical contacts 416*a*, 416*b*, 416*c*, and 416*d* are arranged together prior to being molded with material (e.g., plastic insulating material) forming the tongue 412. At 1108, the material is further molded over the lead frame(s), lower electrical contacts, and upper electrical contacts to form the tongue 412 at 1110.

Aspects of the disclosure are directed to a Universal Serial Bus (USB) socket structure configured for duplex connection. The USB socket structure includes a housing (e.g., shield 410 mated to rear cover 414) and a movable tongue (e.g., tongue 412) disposed within the housing and configured to be moved between a default position (e.g., centered position), a first connected position (e.g., lifted in upward vertical direction), and a second connected position (e.g., lowered in downward vertical direction). The USB socket structure further includes a plurality of first contacts disposed on a first surface of the tongue (e.g., lower electrical contacts 426*a*, 426*b*, 426*c*, and 426*d* disposed on lower surface of tongue 412) and a plurality of second contacts disposed on a second surface of the tongue (e.g., upper electrical contacts 416*a*, 416*b*, 416*c*, and 416*d* disposed on upper surface of tongue 412), wherein the second surface is opposite to the first surface. Moreover, the plurality of first contacts and the plurality of second contacts comprise a curved shape in accordance with USB standard specifications for a Type-A USB receptacle. In an aspect, the USB socket structure also includes a printed circuit board (PCB) footprint that is substantially the same as a footprint for a standard USB receptacle such that the USB socket structure is a drop-in replacement for the standard USB receptacle on a PCB. As used herein, PCB footprint means the layout of physical and electrical connectors on a PCB that correspond to physical or electrical connectors on the component to be attached (e.g., USB socket structure) to the PCB. For example, in FIG. 4, the PCB footprint for the USB socket structure 402 might include PCB connectors (e.g., coupling vias) for each of the four electrical contacts/pins (418*a-d*) and two structural connectors (e.g., holes) for the mounting arms of the shield 410. Collectively, these components of the USB socket structure 402 can securely attach it to the PCB, both physically and electrically.

In an aspect, the movable tongue is configured to be moved to the first connected position responsive to a USB plug (e.g., USB plug 502) being inserted into the housing in a first configuration (e.g., first example orientation) wherein contacts of the USB plug make an electrical connection with the plurality of first contacts (e.g., lower electrical contacts 426*a*, 426*b*, 426*c*, and 426*d*). Also, the movable tongue is configured to be moved to the second connected position responsive to the USB plug being inserted into the housing in a second configuration (e.g., second example orientation) wherein the contacts of the USB plug make an electrical connection with the plurality of second contacts (e.g., upper electrical contacts 416*a*, 416*b*, 416*c*, and 416*d*).

In an aspect, an insertion stopper (e.g., stopper 222) of the USB plug is aligned with a first surface (e.g., lower surface) of the USB plug responsive to the USB plug being inserted into the housing in the first configuration (e.g., first example orientation). As such, the insertion stopper is configured to cause the movable tongue to be moved to the first connected position responsive to the USB plug being inserted into the housing in the first configuration. Moreover, the insertion stopper of the USB plug is aligned with a second surface (e.g., upper surface) of the USB plug responsive to the USB plug being inserted into the housing in the second configuration (e.g., second example orientation). Accordingly, the insertion stopper is configured to cause the movable tongue to be moved to the second connected position responsive to the USB plug being inserted into the housing in the second configuration.

In an aspect, the USB socket structure is configured such that the plurality of second contacts (e.g., upper electrical contacts 416*a*, 416*b*, 416*c*, and 416*d*) float while the movable tongue is in the first connected position (e.g., lifted in upward vertical direction). That is, the plurality of second contacts have no electrical connection to the USB plug inserted into the housing (or to the USB receptacle output pins 418*a*, 418*b*, 418*c*, and 418*d*) responsive to the plurality of second contacts floating while the movable tongue is in the first connected position. The USB socket structure is also configured such that the plurality of first contacts (e.g., lower electrical contacts 426*a*, 426*b*, 426*c*, and 426*d*) float while the movable tongue is in the second connected position (e.g., lowered in downward vertical direction). As such, the plurality of first contacts have no electrical connection to the USB plug inserted into the housing (or to the USB receptacle output pins 418*a*, 418*b*, 418*c*, and 418*d*) responsive to the plurality of first contacts floating while the movable tongue is in the second connected position. For the first and second connected positions, floating here is with respect to the USB signal lines since the "floating" contacts in these positions may contact the shield(s) which may be grounded. In an aspect, the USB socket structure is configured such that the plurality of first contacts and the plurality of second contacts float (e.g., no electrical connection to the USB plug or to the USB receptacle output pins) while the tongue is in the default position (e.g., centered position).

In an aspect, the housing includes a metal shield (e.g., shield 410) configured to enclose a majority of the movable tongue (e.g., tongue 412) and a rear cover (e.g., rear cover 414) configured to mate with the metal shield and enclose an end portion of the movable tongue not enclosed by the metal shield. The end portion of the movable tongue may be attached to the rear cover via a spring loaded mechanism that enables the movable tongue to be moved within an inner space of the metal shield. Moreover, the spring loaded mechanism is configured to enable movement of the movable tongue in a first vertical direction (e.g., vertical upward direction) responsive to the USB plug being inserted into the metal shield in a first configuration (e.g., first example orientation) and enable movement of the movable tongue in a second vertical direction (e.g., vertical downward direction) responsive to the USB plug being inserted into the metal shield in a second configuration (e.g., second example orientation), wherein the second vertical direction is opposite the first vertical direction.

In an aspect, an insertion stopper (e.g., stopper 222) of the USB plug is aligned with a first surface (e.g., lower surface) of the USB plug responsive to the USB plug being inserted into the metal shield in the first configuration (e.g., first example orientation). The stopper of the USB plug is aligned with a second surface (e.g., upper surface) of the USB plug responsive to the USB plug being inserted into the metal shield in the second configuration (e.g., second example orientation). In a further aspect, the USB socket structure is mounted to a printed circuit board (PCB). Accordingly, the insertion stopper of the USB plug is in closer proximity to the PCB responsive to the USB plug being inserted into the metal shield in the first configuration than in response to the USB plug being inserted into the metal shield in the second configuration. Moreover, the insertion stopper of the USB plug is in farther proximity to the PCB responsive to the USB plug being inserted into the metal shield in the second configuration than in response to the USB plug being inserted into the metal shield in the first configuration. Moreover, the movable tongue is closer to the PCB in the second configuration than in the first configuration.

In an aspect, the spring loaded mechanism includes a plurality of guide pins (e.g., guide pins 422) extending through holes in a bottom surface of the rear cover (e.g., rear cover 414) and through holes in the end portion of the movable tongue. The spring loaded mechanism also includes a plurality of springs (e.g., springs 420) appended to upper and lower surfaces of the movable tongue at the holes. The plurality of springs may be configured and sized to enable the plurality of guide pins to pass through an inner diameter of the plurality of springs.

In an aspect, the plurality of guide pins include a first guide pin and a second guide pin and the plurality of springs include upper and lower springs for each of the first guide pin and the second guide pin. The lower springs for each of the first guide pin and the second guide pin are disposed between a bottom surface of the rear cover 414 and a lower surface of the movable tongue 412. The upper springs for each of the first guide pin and the second guide pin are disposed between a top surface of the rear cover 414 and an upper surface of the movable tongue 412. Moreover, the lower springs resist a downward motion of the movable tongue 412 and the upper springs resist an upward motion of the movable tongue 412.

Aspects of the disclosure are also directed to a data storage device (e.g., DSD 104). The data storage device includes a Universal Serial Bus (USB) socket structure for duplex connection, a non-volatile memory (NVM), and a processor (one or more processors) coupled to the NVM and at least one contact of a plurality of first contacts or a plurality of second contacts. The USB socket structure includes a housing and a movable tongue disposed within the housing and configured to be moved between a default position, a first connected position, and a second connected position. The USB socket structure also includes the plurality of first contacts disposed on a first surface of the tongue and the plurality of second contacts disposed on a second surface of the tongue, wherein the second surface is opposite to the first surface, and wherein the plurality of first contacts and the plurality of second contacts include a curved shape in accordance with USB standard specifications for a Type-A USB receptacle. The processor (e.g., controller 108 which may be implemented as one or more processors acting individually or in combination) is configured to receive data via the USB socket structure, store at least a portion of received data in the NVM, and control data transfer between the data storage device and another device (e.g., host 102) connected to the data storage device via the USB socket structure.

Additional Exemplary Apparatus

Figure 12:
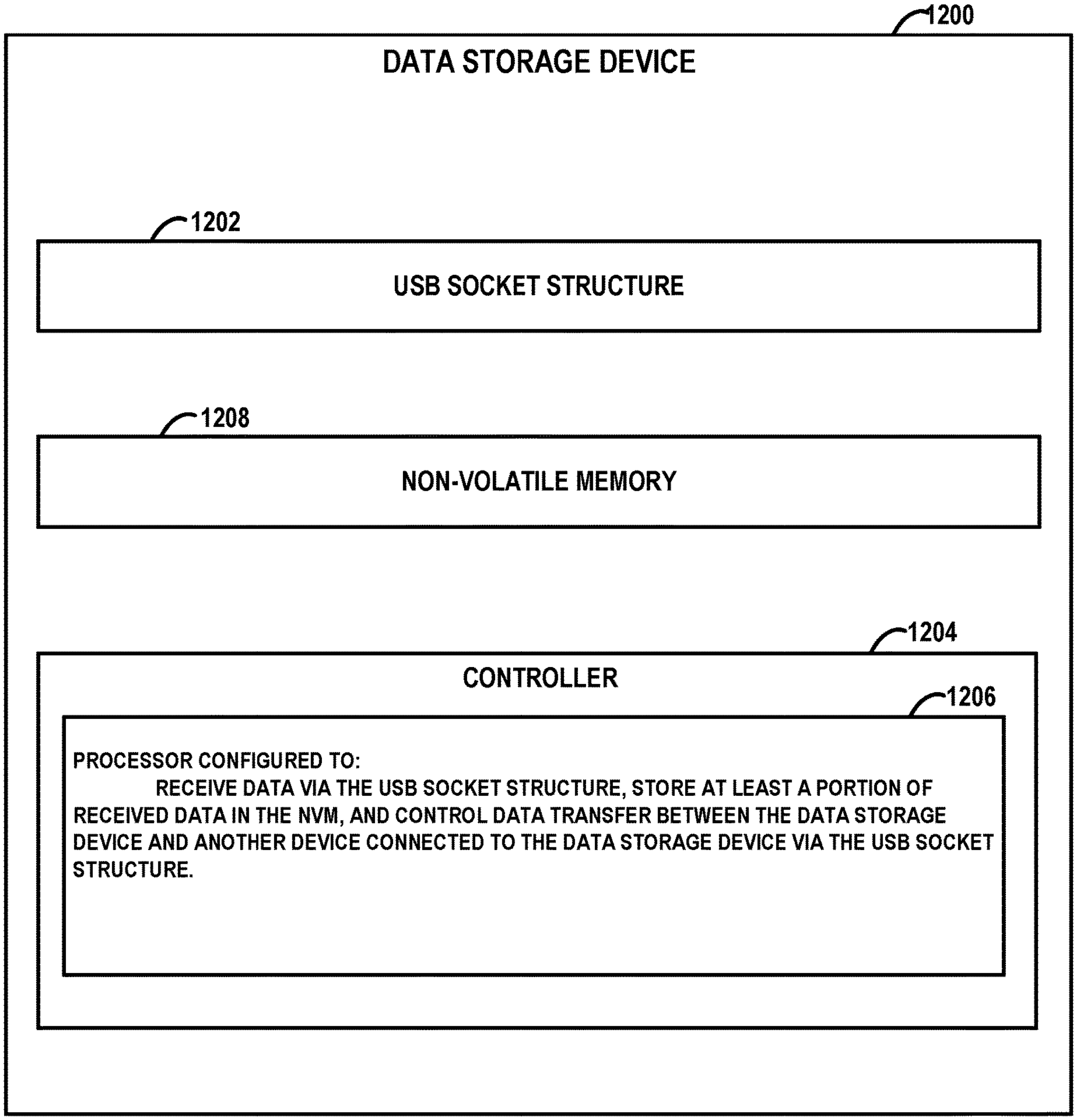
FIG. 12 is a schematic block diagram illustrating an exemplary data storage device configured in accordance with some aspects of the disclosure.

FIG. 12 broadly illustrates a data storage device 1200 configured according to one or more aspects of the disclosure. The data storage device 1200 includes a USB socket structure 1202, a non-volatile memory (NVM) 1208, and a controller 1204 coupled to the NVM 1208 and the USB socket structure 1202. The controller 1204 includes a processor or processing circuit 1206 (which may be implemented as one or more processors acting individually or in combination) configured to receive data via the USB socket structure 1202, store at least a portion of received data in the NVM 1208, and control data transfer between the data storage device 1200 and another device connected to the data storage device 1200 via the USB socket structure 1202.

In one aspect, the USB socket structure includes a housing and a movable tongue disposed within the housing and configured to be moved between a default position, a first connected position, and a second connected position. The USB socket structure further includes a plurality of first contacts disposed on a first surface of the tongue and a plurality of second contacts disposed on a second surface of the tongue, wherein the second surface is opposite to the first surface. Moreover, the plurality of first contacts and the plurality of second contacts include a curved shape in accordance with USB standard specifications for a Type-A USB receptacle.

Figure 13:
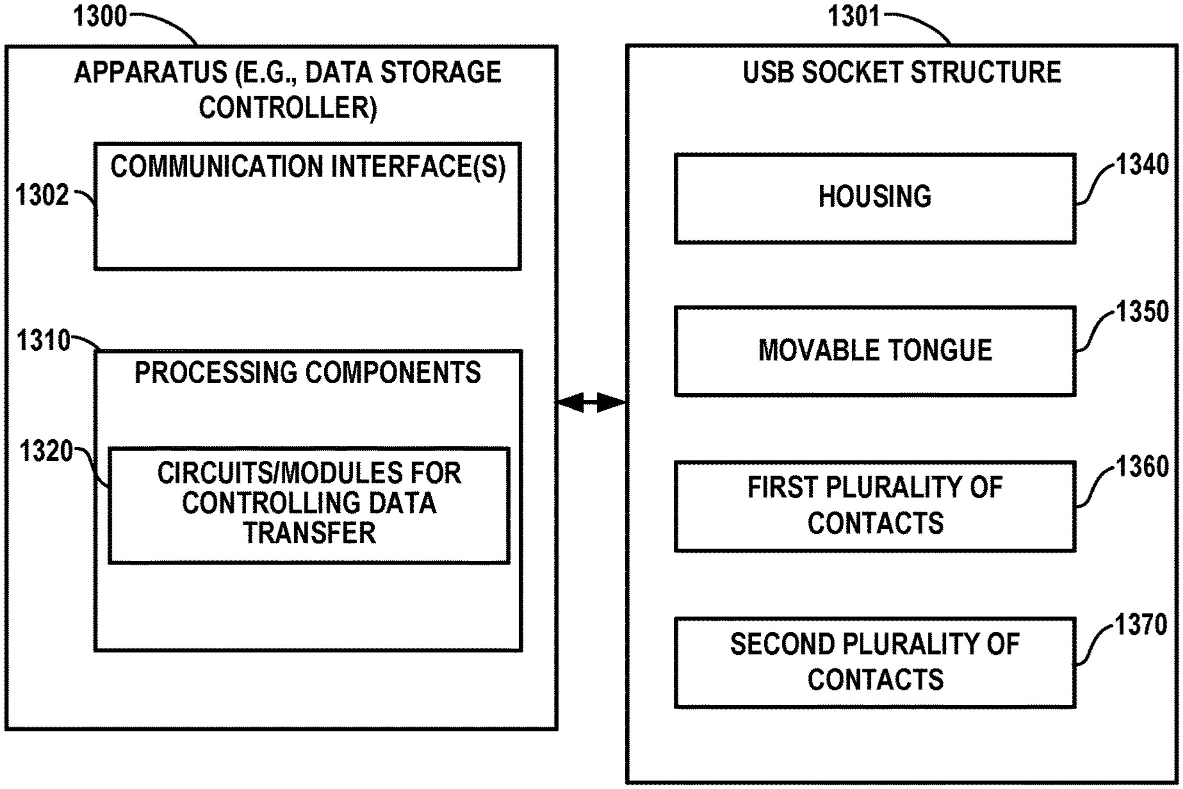
FIG. 13 is a schematic block diagram configuration for an exemplary data storage device configured in accordance with some aspects of the disclosure.

FIG. 13 illustrates an embodiment of an exemplary data storage device configured according to one or more aspects of the disclosure. The data storage device, or components thereof, could embody or be implemented with an apparatus 1300, e.g., data storage controller such as a DSD controller coupled to a volatile memory (not shown) and a USB socket structure 1301 including a housing 1340, a movable tongue 1350 disposed within the housing and configured to be moved between a default position, a first connected position, and a second connected position, a plurality of first contacts 1360 disposed on a first surface of the tongue 1350 and a plurality of second contacts 1370 disposed on a second surface of the tongue 1350, wherein the second surface is opposite to the first surface. In various implementations, the apparatus 1300, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1300 includes a communication interface 1302 and is coupled to the USB socket structure 1301. The communication interface 1302 is further coupled to the housing 1340, the movable tongue 1350, the plurality of first contacts 1360, and the plurality of second contacts 1370. These components can be coupled to and/or placed in electrical communication with one another via suitable components, represented generally by the connection line in FIG. 13. Although not shown, other circuits such as timing sources, peripherals, voltage regulators, and power management circuits may be provided, which will not be described any further.

The communication interface 1302 of the apparatus 1300 provides a means for communicating with other apparatuses over a transmission medium. In some implementations, the communication interface 1302 includes circuitry and/or programming (e.g., a program) adapted to facilitate the communication of information bi-directionally with respect to one or more devices in a system. In some implementations, the communication interface 1302 may be configured for wire-based communication. For example, the communication interface 1302 could be a bus interface, a send/receive interface, or some other type of signal interface including circuitry for outputting and/or obtaining signals (e.g., outputting signal from and/or receiving signals into a DSD).

In one aspect, the apparatus 1300 may also include volatile memory for storing instructions and other information to support the operation of the processing components 1310.

The apparatus 1300 includes various processing components 1310 arranged or configured to obtain, process and/or send data, control data access and storage, issue or respond to commands, and control other desired operations. For example, the processing components 1310 may be implemented as one or more processors, one or more controllers, and/or other structures configured to perform functions. According to one or more aspects of the disclosure, the processing components 1310 may be adapted to perform any or all of the features, processes, functions, operations and/or routines described herein. For example, the processing components 1310 may be configured to perform any of the steps, functions, and/or processes described with respect to FIGS. 1-12. As used herein, the term "adapted" in relation to processing components 1310 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-12. The processing components 1310 serve as an example of a means for processing. In various implementations, the processing components 1310 may provide and/or incorporate, at least in part, functionality described above for the components of controller 108 of FIG. 1 or controller 1204 of FIG. 12.

According to at least one example of the apparatus 1300, the processing components 1310 may include one or more of circuits/modules 1320 configured for controlling data transfer between the data storage device and another device connected to the data storage device via the USB socket structure 1301.

In at least some examples, means may be provided for performing the functions illustrated in FIG. 13 and/or other functions illustrated or described herein. For example, the means may include one or more of: means, such as circuits/modules 1320, for controlling data transfer between the data storage device and another device connected to the data storage device via the USB socket structure 1301.

Additional Aspects

The USB receptacle (socket structure) described herein having a movable tongue that enables a USB plug to be mated to the USB receptacle in two orientations has a number of advantages related to efficiency and reliability. For example, the USB receptacle described herein reduces (or eliminates) the trial and error involved with manually aligning the USB plug to the USB receptacle prior to mating as opposed to conventional USB socket structures. Thus, the time and effort required to successfully mate the USB plug with the USB receptacle is decreased. In another example, the USB socket structure described herein prevents the USB plug from being inserted into the USB receptacle in the wrong orientation as opposed to conventional USB socket structures. Thus, the reliability of the USB receptacle is increased since any damage-causing repeated insertions of the USB plug into the USB receptacle in the wrong orientation is reduced (or eliminated).

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, a datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A Universal Serial Bus (USB) socket structure configured for duplex connection, the USB socket structure comprising:

a housing;

a movable tongue disposed within the housing and configured to be moved between a default position, a first connected position, and a second connected position;

a plurality of first contacts disposed on a first surface of the tongue; and a plurality of second contacts disposed on a second surface of the tongue, the second surface opposite to the first surface;

wherein the plurality of first contacts and the plurality of second contacts comprise a curved shape; and wherein the housing comprises:

a metal shield configured to enclose a majority of the movable tongue; and a rear cover configured to mate with the metal shield and enclose an end portion of the movable tongue not enclosed by the metal shield.

2. The USB socket structure of claim 1, wherein the curved shape is a curved shape in accordance with USB standard specifications for a Type-A USB receptacle.

3. The USB socket structure of claim 1, wherein:

the movable tongue is configured to be moved to the first connected position responsive to a USB plug being inserted into the housing in a first configuration wherein contacts of the USB plug make an electrical connection with the plurality of first contacts; and the movable tongue is configured to be moved to the second connected position responsive to the USB plug being inserted into the housing in a second configuration wherein the contacts of the USB plug make an electrical connection with the plurality of second contacts.

4. The USB socket structure of claim 3, wherein:

an insertion stopper of the USB plug is configured to cause the movable tongue to be moved to the first connected position responsive to the USB plug being inserted into the housing in the first configuration; and the insertion stopper of the USB plug is configured to cause the movable tongue to be moved to the second connected position responsive to the USB plug being inserted into the housing in the second configuration.

5. The USB socket structure of claim 1, wherein:

the USB socket structure is configured such that the plurality of second contacts float while the movable tongue is in the first connected position; and the USB socket structure is configured such that the plurality of first contacts float while the movable tongue is in the second connected position.

6. The USB socket structure of claim 5, wherein:

the plurality of second contacts have no electrical connection to a USB plug inserted into the housing responsive to the plurality of second contacts floating as the movable tongue is in the first connected position; and the plurality of first contacts have no electrical connection to the USB plug inserted into the housing responsive to the plurality of first contacts floating as the movable tongue is in the second connected position.

7. The USB socket structure of claim 5, wherein the USB socket structure is configured such that the plurality of first contacts and the plurality of second contacts float while the movable tongue is in the default position.

8. The USB socket structure of claim 1, wherein the end portion of the movable tongue is attached to the rear cover via a spring loaded mechanism that enables the movable tongue to be moved within an inner space of the metal shield.

9. The USB socket structure of claim 8, wherein:

the spring loaded mechanism is configured to move the movable tongue in a first vertical direction responsive to a USB plug being inserted into the metal shield in a first configuration; and the spring loaded mechanism is configured to move the movable tongue in a second vertical direction responsive to the USB plug being inserted into the metal shield in a second configuration, wherein the second vertical direction is opposite the first vertical direction.

10. The USB socket structure of claim 9, wherein:

the USB socket structure is mounted to a printed circuit board (PCB); and the movable tongue is closer to the PCB in the second configuration than in the first configuration.

11. The USB socket structure of claim 8, wherein the spring loaded mechanism comprises:

a plurality of guide pins extending through holes in a bottom surface of the rear cover and through holes in the end portion of the movable tongue; and a plurality of springs disposed on the plurality of guide pins and configured to contact with upper and lower surfaces of the movable tongue at the holes in the end portion of the movable tongue.

12. The USB socket structure of claim 11, wherein the plurality of springs are sized to enable the plurality of guide pins to pass through an inner diameter of the plurality of springs.

13. The USB socket structure of claim 11, wherein:

the plurality of guide pins comprise a first guide pin and a second guide pin;

the plurality of springs comprise upper and lower springs for each of the first guide pin and the second guide pin;

the lower springs for each of the first guide pin and the second guide pin are disposed between the bottom surface of the rear cover and the lower surface of the movable tongue; and the upper springs for each of the first guide pin and the second guide pin are disposed between a top surface of the rear cover and the upper surface of the movable tongue.

14. The USB socket structure of claim 11, wherein:

the lower springs resist a downward motion of the movable tongue; and the upper springs resist an upward motion of the movable tongue.

15. The USB socket structure of claim 1, wherein:

the end portion of the movable tongue comprises retaining knobs extending from side surfaces of the movable tongue and the rear cover comprises slots formed at side surfaces of the rear cover;

the retaining knobs of the movable tongue are configured to extend through the slots of the rear cover, respectively, to maintain an alignment of the movable tongue in the housing; and a size of the slots define a range of vertical movement of the movable tongue within the housing.

16. The USB socket structure of claim 1, further comprising a printed circuit board (PCB) footprint that is substantially the same as a footprint for a standard USB connector such that the USB socket structure is a drop-in replacement for the standard USB connector on a PCB.

17. A data storage device, comprising:

a Universal Serial Bus (USB) socket structure for duplex connection comprising:

a housing;

a movable tongue disposed within the housing and configured to be moved between a default position, a first connected position, and a second connected position;

a plurality of first contacts disposed on a first surface of the tongue; and a plurality of second contacts disposed on a second surface of the tongue, the second surface opposite to the first surface;

wherein the plurality of first contacts and the plurality of second contacts comprise a curved shape;

a non-volatile memory (NVM); and one or more processors coupled to the NVM and at least one contact of the plurality of first contacts or the plurality of second contacts, the one or more processors, individually or in combination, configured to:

receive data via the USB socket structure; and store at least a portion of received data in the NVM.

18. The data storage device of claim 17, wherein the processor is further configured, individually or in combination, to control data transfer between the data storage device and another device connected to the data storage device via the USB socket structure.

19. The data storage device of claim 17, wherein the USB socket structure further comprises a printed circuit board (PCB) footprint that is substantially the same as a footprint for a standard USB connector such that the USB socket structure is a drop-in replacement for the standard USB connector on a PCB.

* * * * *